United States Patent
Cramer et al.

(10) Patent No.: US 12,140,215 B2
(45) Date of Patent: Nov. 12, 2024

(54) GEAR MECHANISM FOR A ROLLING MILL DRIVE, ROLLING MILL DRIVE WITH A GEAR MECHANISM, AND USE OF THE GEAR MECHANISM AS A ROLLING MILL GEAR MECHANISM

(71) Applicant: SMS group GmbH, Düsseldorf (DE)

(72) Inventors: Markus Cramer, Attendorn (DE); Jan Steinseifer, Hilchenbach (DE); Klaus Lazzaro, Kirchhundem (DE)

(73) Assignee: SMS group GmbH, Düsseldorf (DE)

( * ) Notice: Subject to any disclaimer, the term of this patent is extended or adjusted under 35 U.S.C. 154(b) by 0 days.

(21) Appl. No.: 18/011,118

(22) PCT Filed: Jun. 16, 2021

(86) PCT No.: PCT/EP2021/066170
§ 371 (c)(1),
(2) Date: Dec. 16, 2022

(87) PCT Pub. No.: WO2021/255059
PCT Pub. Date: Dec. 23, 2021

(65) Prior Publication Data
US 2023/0272847 A1   Aug. 31, 2023

(30) Foreign Application Priority Data

Jun. 17, 2020 (DE) .................. 10 2020 207 477.1
Jun. 15, 2021 (DE) .................. 10 2021 206 054.4

(51) Int. Cl.
F16H 55/08   (2006.01)
(52) U.S. Cl.
CPC ..... *F16H 55/08* (2013.01); *F16H 2055/0893* (2013.01)

(58) Field of Classification Search
CPC ................. F16H 55/08; F16H 55/0806; F16H 2055/0893
See application file for complete search history.

(56) References Cited

U.S. PATENT DOCUMENTS

| 1,144,137 | A | * | 6/1915 | Kennedy | ................. | F16H 55/08 |
| | | | | | | 74/447 |
| 4,643,654 | A | * | 2/1987 | Rinder | .................... | F01C 1/084 |
| | | | | | | 418/201.3 |

(Continued)

FOREIGN PATENT DOCUMENTS

| CN | 108681655 A | 10/2018 |
| DE | 2446172 A1 | 4/1976 |

(Continued)

OTHER PUBLICATIONS

Forschungsvereinigung Antriebstechnik e.V., Arbeitskreis Stirnräder, "Freie Zahnfußgeometrie", Heft 1194, 2016.

(Continued)

*Primary Examiner* — Jake Cook
(74) *Attorney, Agent, or Firm* — Smartpat PLC

(57) ABSTRACT

A gear mechanism (6) for a rolling mill drive includes at least one involute cylindrical gear tooth system between at least two intermeshing gear wheels (3) with asymmetrical gearing. The normal pressure angle of the load-bearing tooth flanks (5) of the gear wheels (3) is greater than 20° and less than or equal to 30°, and the normal pressure angle of the trailing flanks (4) of the gear wheels is greater than or equal to 14° and less than 22°. A rolling mill drive has a gear mechanism (6) of this type, and the gear mechanism (6) is used as a rolling mill gear mechanism.

6 Claims, 4 Drawing Sheets

(56) References Cited

U.S. PATENT DOCUMENTS

| | | | | |
|---|---|---|---|---|
| 4,651,588 A | * | 3/1987 | Rouverol | ............ F16H 55/0886 |
| | | | | 74/462 |
| 5,454,702 A | * | 10/1995 | Weidhass | ................ F04C 2/084 |
| | | | | 74/462 |
| 9,145,964 B2 | * | 9/2015 | Potts | ......................... B23F 9/00 |
| 2009/0064812 A1 | | 3/2009 | Gutmann et al. | |
| 2013/0035197 A1 | | 2/2013 | Sartori et al. | |
| 2015/0059523 A1 | | 3/2015 | Lieder et al. | |
| 2017/0183061 A1 | | 6/2017 | Yamamoto | |
| 2017/0184181 A1 | | 6/2017 | Venter et al. | |

FOREIGN PATENT DOCUMENTS

| | | |
|---|---|---|
| DE | 102006015521 | 4/2007 |
| DE | 102012203177 A1 | 9/2013 |
| EP | 2551550 B1 | 4/2014 |
| EP | 3184856 A1 | 6/2017 |
| WO | 2015022129 A2 | 2/2015 |

OTHER PUBLICATIONS

Forschungsvereinigung Antriebstechnik e.V., Arbeitskreis Stirnräder, "Normberechnung asymmetrische Verzahnung," Heft 1142, 2015.
Forschungsvereiningung Antriebstechnik e.V., "Sonderprofil Evolventische und nichtevolventische Sonderverzahnungen", 1994.

* cited by examiner

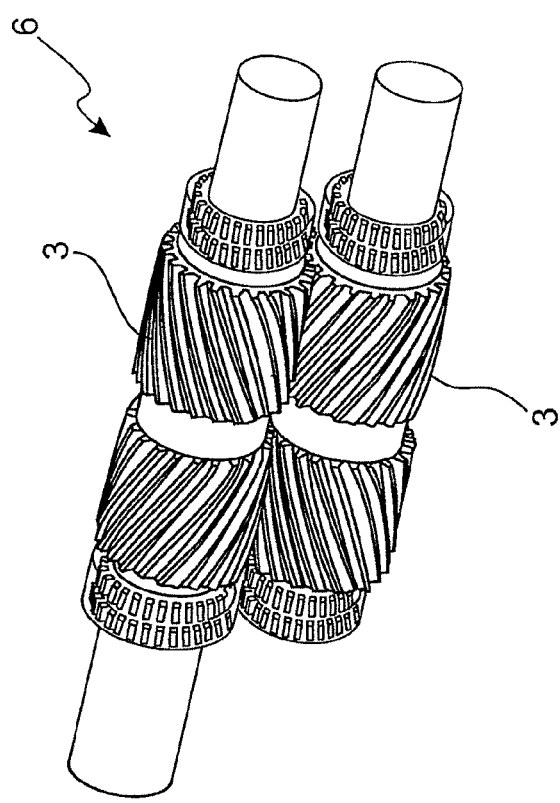

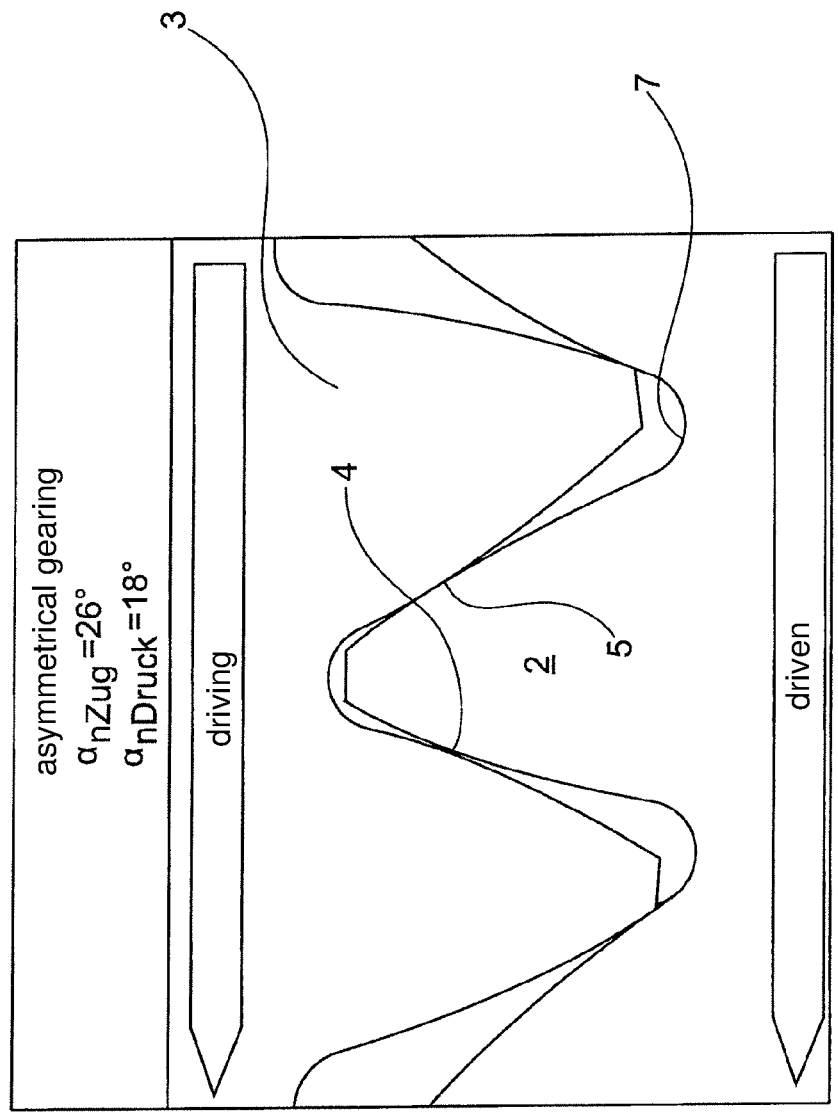

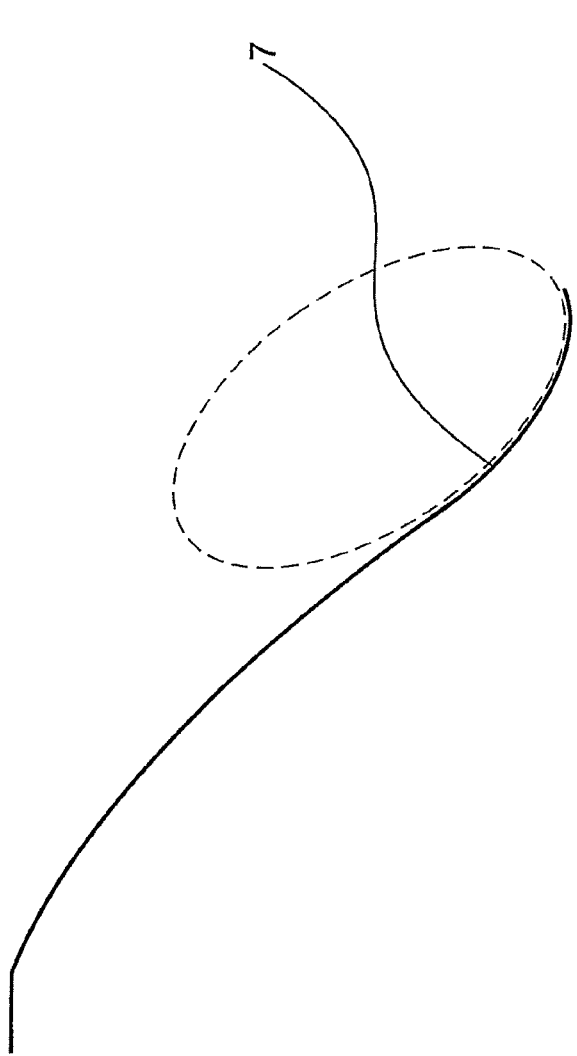

GEAR MECHANISM FOR A ROLLING MILL DRIVE, ROLLING MILL DRIVE WITH A GEAR MECHANISM, AND USE OF THE GEAR MECHANISM AS A ROLLING MILL GEAR MECHANISM

TECHNICAL FIELD

The invention involves a gear mechanism for a rolling mill drive, a rolling mill drive with a gear mechanism, and the use of the gear mechanism as a rolling mill gear mechanism.

BACKGROUND

A large number of drive components in rolling mills, in particular drive components of rolling mills for metallic flat products, are operated without changing the direction of rotation or load. It is state of the art to design the gear teeth in the drivetrain of rolling mills symmetrically. The symmetry refers to the flank angles of the teeth. Usually, both the load-bearing flank (working flank) and the unloaded flank (trailing flank) of the gear wheels are designed with a normal pressure angle (an equal to 20°).

Such symmetrical gearing in gear mechanisms that are operated in only one direction of rotation has the disadvantage that the same working flanks of the gear wheels are always subjected to load during a rotation. Due to the one-sided load on only one tooth flank in each case, the full potential of the gear mechanism is only inadequately utilized with regard to its power density.

The provision of gear mechanisms with asymmetrical gearing is generally known in the state of the art. The principle of asymmetrical gearing is based on different flank pressure angles of one tooth of the gearing in each case. This measure is intended to achieve an increase in the load capacity and smooth running of the gear mechanism. Due to a targeted increase in the pressure angle of the tooth flanks on the side of the tooth subjected to tensile stress, the tooth base stresses and Hertzian stresses occurring on this side are reduced. This contact stress between the tooth flanks in mesh with each other is dependent on the tooth curvature radii of the respective tooth flanks.

Furthermore, designing gear mechanisms with involute gearing is known from the state of the art. In involute gearing, the force exerted by the tooth flanks on each other runs normal to the gear profile and tangential to the base circle diameters of both gear wheels through what is called the pitch point. In involute gearings, a distinction is made between gearings with or without profile shifting. For example, an involute cylindrical gear tooth system with a profile shift is known from DE 24 46 172 OS. This publication describes an involute cylindrical gear tooth system between two intermeshing gear wheels, wherein the magnitude of the profile shift varies linearly across the tooth width. In particular, this is intended to ensure that the tooth flanks of the intermeshing teeth are not subjected to loads abruptly, but gradually.

SUMMARY

The invention is based on the task of providing a gear mechanism for a rolling mill drive that is improved in terms of smooth running and load-bearing capacity compared with the gear mechanisms according to the state of the art. In particular, a significant increase in the load-bearing capacity of the gear mechanism is to be achieved. This means that a correspondingly high strength of the gear wheels is to be achieved with a correspondingly high torque transmission.

According to one aspect of the invention, a gear mechanism is provided for a rolling mill drive comprising at least one involute cylindrical gear tooth system between at least two intermeshing gear wheels having asymmetrical gearing, wherein the normal pressure angle $\alpha_n$ of the load-bearing tooth flanks of the gear wheels is greater than 20° and less than or equal to 30°, and the normal pressure angle $\alpha_n$ of the trailing flanks of the gear wheels is greater than or equal to 14° and less than 22°. The load-bearing flank of the gear wheels, which is hereinafter also referred to as the working flank, is the flank that leads the tooth of the driving gear in the direction of rotation and is under tensile load, whereas the trailing flank of the tooth is the flank that is trailing on the driving gear in the direction of rotation of the gear and that is under compressive stress. In the driven gear, the load-bearing flank of the tooth is the flank that is in mesh with the load-bearing flank of the tooth of the driving gear, i.e., facing it. This tooth flank is under tensile stress during the meshing process.

In a research project of the Forschungsvereinigung Antriebstechnik e. V. (FVA booklet No. 2141 X Standard calculation of asymmetrical gearing, published on Jun. 30, 2015), a draft standard calculation for the geometry and load-bearing capacity of asymmetrical gearing is presented. In research project number 484 III of the Forschungsvereinigung Antriebstechnik e. V. (FVA booklet No. 1126, published on Feb. 28, 2015), a design methodology for asymmetric cylindrical gear gearings is presented, whereby the influence of the load-bearing capacity of asymmetrical cylindrical gear gearings to the profile overlap is pointed out. The design recommendation is to match the profile overlap of the asymmetrical gearing to a symmetrical reference gearing if at all possible. Both publications, as well as the literature references cited therein, describe an increase in load-bearing capacity due to the reduction in tooth base stresses. However, this approach has the disadvantage that, for the numerical strength verification of the individual parameter studies, only the equivalent stresses according to the Mises hypothesis (GEH) were used. With this type of equivalent stress, the information of effective direction, stress components and also their sign (tensile or compressive stress) are lost. The aspect of a purely static load is much more critical when considering the model described there. Using this static approach, the maximum stress occurring in terms of magnitude can be determined, but not the distribution of the maximum stress amplitude occurring during the meshing cycle of the gear wheels and the mean stress. In particular, the stress amplitude has a significant influence on the cyclic bending stress and thus on the component strength as well.

The inventors of the present patent application have defined particular geometric influencing parameters that have been used to optimize an asymmetrical gearing profile specifically for use in rolling mill gears. The target value ranges of the optimization profile are defined by the following eight inequalities:

| | |
|---|---|
| $0.99 \cdot \varepsilon_\alpha (\alpha_n = 20°) < \varepsilon_{\alpha_{Zug}} (\alpha_{n_{Zug}}, \alpha_{n_{Druck}}, h_{aP_{Zug}}) < 1.05 \cdot \varepsilon_\alpha (\alpha_n = 20°)$ | Eq. 1 |
| $0.3 \cdot m_n < s_{an1}(\alpha_{n_{Zug}}, \alpha_{n_{Druck}}) h_{aP_{Zug}}) \leq 0.4 \cdot m_n)$ | Eq. 2 |
| $0.3 \cdot m_n < s_{an2}(\alpha_{n_{Zug}}, \alpha_{n_{Druck}}) h_{aP_{Zug}}) \leq 0.4 \cdot m_n)$ | Eq. 3 |
| $\alpha_{n_{Zug}} > \alpha_{n_{Druck}}$ | Eq. 4 |
| $0.25 \cdot m_n \leq c_1 (\alpha_{n_{Zug}}, \alpha_{n_{Druck}}, h_{aP_{Zug}}, h_{fP_{Zug}})$ | Eq. 5 |
| $0.25 \cdot m_n \leq c_2 (\alpha_{n_{Zug}}, \alpha_{n_{Druck}}, h_{aP_{Zug}}, h_{fP_{Zug}})$ | Eq. 6 |

-continued $$d_{Ff1}(\alpha_{nZug}) < d_{Nf1}(\alpha_{nZug}, \alpha_{nDruck}, h_{aPZug}) \quad \text{Eq. 7}$$
$$d_{Ff2}(\alpha_{nZug}) < d_{Nf2}(\alpha_{nZug}, \alpha_{nDruck}, h_{aPZug}) \quad \text{Eq. 8}$$

wherein:

| | |
|---|---|
| $\varepsilon_\alpha(\alpha_n) = 20°)$ | Profile overlap for the symmetrical 20° reference gearing |
| $\varepsilon_{\alpha Zug}(\alpha_{ntension}, \alpha_{nDruck}, h_{aPZug})$ | Profile overlap in load flank meshing for asymmetrical gearing, as a function of the pressure angles and the addendum coefficient |
| $\alpha_{nZug}$ | Normal pressure angle of the load flank |
| $\alpha_{nDruck}$ | Normal pressure angle of the trailing flank |
| $h_{aPZug}$ | Addendum coefficient of the reference profile |
| $h_{fPZug}$ | Dedendum coefficient of the reference profile |
| $m_n$ | Standard module |
| $c_1(\alpha_{nZug}, \alpha_{nDruck}, h_{aPZug}, h_{fPZug})$ | Head clearance at wheel 1, as a function of the pressure angles and the addendum and dedendum coefficients |
| $c_2(\alpha_{nZug}, \alpha_{nDruck}, h_{aPZug}, h_{fPZug})$ | Head clearance at wheel 2, as a function of the pressure angles and the addendum and dedendum coefficients |
| $d_{Ff1}(\alpha_{nZug})$ | Root form diameter at wheel 1, as a function of the pressure angle |
| $d_{Ff2}(\alpha_{nZug})$ | Root form diameter at wheel 2, as a function of the pressure angle |
| $d_{Nf1}(\alpha_{nZug}, \alpha_{nDruck}, h_{aPZug})$ | Effective root diameter at wheel 1, as a function of the pressure angles and the addendum coefficient |
| $d_{Nf2}(\alpha_{nZug}, \alpha_{nDruck}, h_{aPZug})$ | Effective root diameter at wheel 2, as a function of the pressure angles and the addendum coefficient |

The target ranges ensure compliance with the profile overlap, compliance with the minimum tooth tip thickness, and compliance with the minimum tip clearance. Furthermore, compliance with the asymmetrical tooth profile is required, and the generation of meshing interference is excluded. These specifications mean that the asymmetrical tooth profile is optimally adapted to the load situation in continuously operated rolling mill drivetrains.

According to the invention, this results in an optimum asymmetrical tooth profile if the normal pressure angle of the load-bearing tooth flanks of the gear wheels is greater than 20° and less than or equal to 30° and the normal pressure angle of the trailing flanks of the gear wheels is greater than or equal to 14° and less than 22°, preferably greater than or equal to 14° and less than 20°.

In a preferred embodiment of the gear mechanism according to the invention, the tooth space profile has an elliptical tooth base rounding. An elliptical transition between the involutes of the tooth flanks and the tooth base area results in a further significant increase in tooth base load-bearing capacity.

In another advantageous embodiment of the gear mechanism according to the invention, the normal pressure angle $\alpha_n$ of the load-bearing tooth flanks is between 25° and 28°, and the normal pressure angle $\alpha_n$ of the trailing flanks is between 18° and 22°.

It is further advantageous and expedient if the reference profile addendum coefficient of the load-bearing tooth flanks of the gear wheels is between 1 and 1.2. The reference profile addendum coefficient results in the tooth tip height in millimeters as the factor of the normal module.

In another advantageous embodiment of the gear mechanism of the invention, the reference profile dedendum coefficient of the gear wheels is between 1.2 and 1.4. The reference profile dedendum coefficient multiplied by the normal module of the gearing results in the height of the tooth base in millimeters.

The normal module of the gear wheels is between 16 and 40 mm.

Another aspect of the invention involves a rolling mill drive that has a gear mechanism with at least one of the features described above. Finally, the invention involves the use of a gear mechanism that has one or more of the features described above as a rolling mill gear mechanism.

The invention is explained below with reference to the embodiments shown in the drawings.

BRIEF DESCRIPTION OF THE DRAWINGS

FIG. 2 is a schematic drawing of an involute cylindrical gear tooth system between two intermeshing gear wheels of a gear mechanism of a rolling mill drive, FIG. 3 is a schematic drawing of two intermeshing gear wheels of an asymmetrical involute cylindrical gear tooth system according to the invention, and FIG. 4 is a schematic drawing of the elliptical tooth base rounding of the load-bearing tooth flank of a tooth profile according to the invention.

DETAILED DESCRIPTION

Figure 1A:
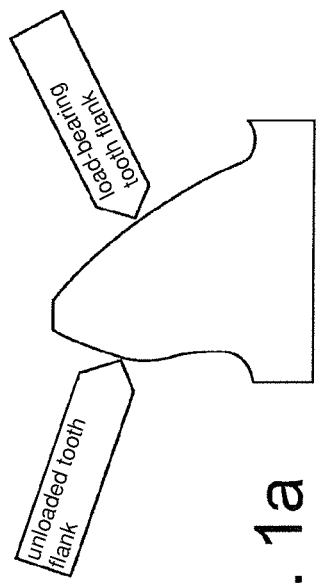
FIG. 1a is a schematic drawing of the tooth profile shapes of a symmetrical and an asymmetrical gearing.

FIG. 1a schematically illustrates the profile of a single tooth 2 of a gear wheel 3, wherein the left drawing in FIG. 1a illustrates a symmetrical tooth profile, and the right drawing in FIG. 1a illustrates an asymmetrical tooth profile. The left tooth flank in each instance is referred to below as trailing flank 4, while the right tooth flank is referred to as load-bearing tooth flank 5.

Figure 1C:
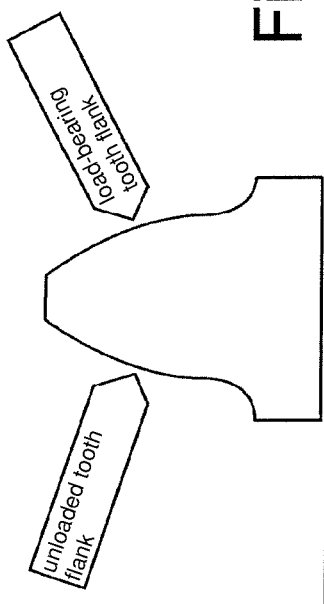
FIG. 1b is a schematic illustration of the stress behavior of intermeshing teeth of an asymmetrical gearing, wherein the upper drawing illustrates the tensile stress at location A of tooth 2 and the lower drawing the compressive stress at the same location A, FIG. 1c compares the differences between the tooth stress according to known theoretical calculation bases and the actual stress behavior according to investigations conducted by the inventors of this patent application.
Figure 1C:
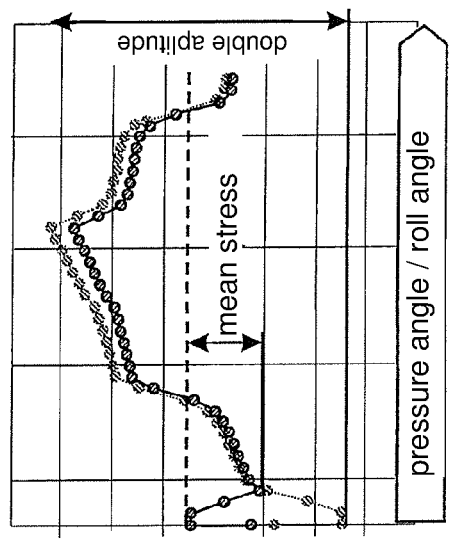
Figure 1B:
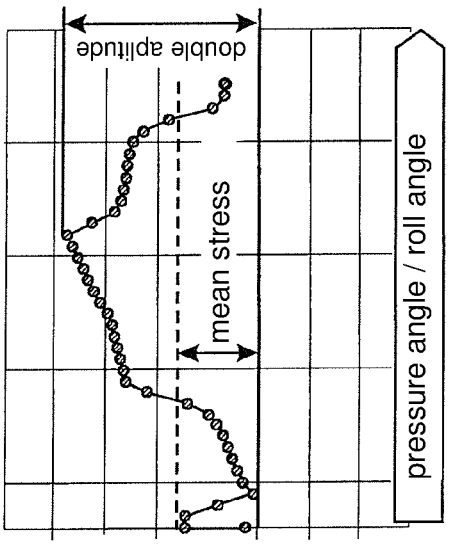
Figure 1B:
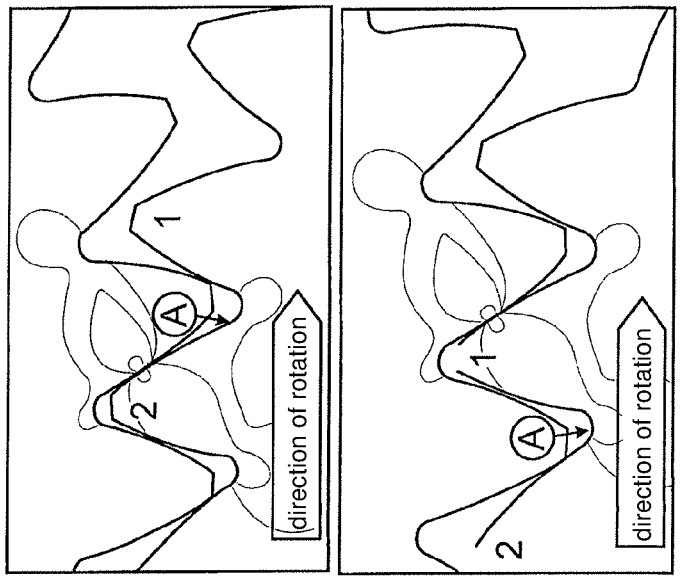

An analysis by the inventors of the draft standard calculation for the geometry and load-bearing capacity of asymmetrical gearings presented in research project number 2141 X has resulted in the fact that the research results known to date do not adequately reflect the actual stress behavior of the tooth flanks. A corresponding comparison is illustrated in FIGS. 1b and 1c. Both drawings illustrate intermeshing gear wheels 3 and, in thin lines, the stress curve of the intermeshing tooth flanks of teeth 1 and 2. In the upper drawing, the tensile stress of tooth 2 at location A is considered, whereas the compressive stress of the tooth at location A is considered in the lower drawing.

In FIG. 1c, the left graph shows the theoretical stress curve resulting from the draft standard calculation according to the research project, whereas the right graph compares the equivalent stress according to the Mises hypothesis and the actually determined stress behavior of the tooth flanks. The actual stress behavior is illustrated with the lighter graph. The maximum level of compressive stress at location A according to the lower drawing in FIG. 1b and the maximum level of tensile stress at location A according to the upper drawing in FIG. 1b correspond to the stresses that actually occur according to the tests on which the invention is based. It follows that the exclusive consideration of the maximum level of Mises stress (left graph in FIG. 1c) is not a sufficient criterion for the strength assessment. The directional influence and the effect of the stress (tension/compression)—as well as the unsteady behavior across the tooth mesh—must be taken into account. When there are small tooth gaps, i.e., in the case of extreme pressure angle combinations, coupling influences of the adjacent teeth via the tooth mesh can be observed, which increase the double amplitude of the tooth base stresses and thus reduce the load-bearing capacity.

FIG. 3 illustrates an involute cylindrical gear tooth system optimized according to the invention for two gear wheels 3 in mesh with each other, wherein gear wheel 3 illustrated above in FIG. 3 is the driving gear wheel, and the gear wheel illustrated below in FIG. 3 is the driven gear wheel. The normal pressure angle $\alpha_n$ of load-bearing tooth flanks 5 of the driving gear wheel is 26° in this embodiment, whereas the normal pressure angle $\alpha_n$ of trailing flank 4 of this gear wheel is 18°. According to the invention, such geometry has proved to be particularly advantageous in, among other things, an asymmetrical involute cylindrical gear tooth system of a gear mechanism 6 for a rolling mill drive. Such a gear mechanism 6 as a large gear mechanism with a normal module m between 16 and 40 mm in size is illustrated in FIG. 2. With the tooth profile according to the invention, a torque increase of at least 12% can be achieved.

An advantageous design of tooth base rounding 7 is illustrated in FIG. 4. This allows a further increase in the tooth base load-bearing capacity to be achieved. As indicated in dashed lines, according to the invention, the tooth profile is provided with an elliptical transition between the involute and the tooth base region.

REFERENCE NUMBER LIST 1, 2 Teeth
3 Gear wheel
4 Trailing flank
5 Load-bearing tooth flank
6 Gear mechanism
7 Tooth base rounding

The invention claimed is:

1. A rolling mill drive, comprising:
a gear mechanism (6), including
an involute cylindrical gear tooth system between at least two intermeshing gear wheels (3) with asymmetrical gearing,
wherein a normal pressure angle of load-bearing tooth flanks (5) of the gear wheels (3) is greater than 20° and less than or equal to 30°, and
wherein a normal pressure angle of trailing flanks (4) of the gear wheels is greater than or equal to 14° and less than 22°,
wherein the asymmetrical gearing causes an increased load capacity of the gear mechanism (6) compared to an equivalent gear mechanism with symmetrical gearing having identical normal pressure angles on load-bearing tooth flanks and trailing flanks, and
wherein the asymmetrical gearing causes the load capacity of the gear mechanism to increase by at least 12%.

2. The rolling mill drive according to claim 1,
wherein a tooth space profile (7) of the gear wheels (3) has an elliptical tooth base rounding.

3. The rolling mill drive according to claim 1,
wherein the normal pressure angle of the load-bearing tooth flanks (5) is between 25° and 28°, and
wherein the normal pressure angle of the trailing flanks (4) is between 15° and 21°.

4. The rolling mill drive according to claim 1,
wherein a reference profile addendum coefficient of the load-bearing tooth flanks (5) of the gear wheels (3) is between 1 and 1.2.

5. The rolling mill drive according to claim 1,
wherein a dedendum coefficient of the reference profile of the load-bearing tooth flanks (5) of the gear wheels (3) is between 1.2 and 1.4.

6. The rolling mill drive according to claim 1,
wherein a normal module (m) of the gear wheels (3) is between 16 and 40 mm.

* * * * *